(12) United States Patent
Ikarashi et al.

(10) Patent No.: US 10,679,522 B2
(45) Date of Patent: Jun. 9, 2020

(54) SECURE COMPUTATION APPARATUS, SECURE COMPUTATION METHOD AND PROGRAM

(71) Applicant: NIPPON TELEGRAPH AND TELEPHONE CORPORATION, Chiyoda-ku (JP)

(72) Inventors: Dai Ikarashi, Musashino (JP); Koji Chida, Musashino (JP); Koki Hamada, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 281 days.

(21) Appl. No.: 15/737,915

(22) PCT Filed: Jun. 13, 2016

(86) PCT No.: PCT/JP2016/067529
§ 371 (c)(1),
(2) Date: Dec. 19, 2017

(87) PCT Pub. No.: WO2016/208437
PCT Pub. Date: Dec. 29, 2016

(65) Prior Publication Data
US 2018/0158377 A1 Jun. 7, 2018

(30) Foreign Application Priority Data
Jun. 24, 2015 (JP) ................................ 2015-126179

(51) Int. Cl.
*G09C 1/00* (2006.01)
(52) U.S. Cl.
CPC ............ *G09C 1/00* (2013.01); *H04L 2209/46* (2013.01)

(58) Field of Classification Search
CPC .............................. H04L 2209/46; G09C 1/00
See application file for complete search history.

(56) References Cited

U.S. PATENT DOCUMENTS

| 2013/0182836 A1* | 7/2013 | Hamada | H04L 9/085 380/28 |
| 2013/0304780 A1* | 11/2013 | Ikarashi | H04L 9/085 708/250 |

(Continued)

OTHER PUBLICATIONS

Bogdanov, et al., "High-performance secure multi-party calculation for data mining applications," Int. J. Inf. Sec., 11(6), Springer, 2012, 16 Pages.
Chida, et al., "A Three-Party Secure Function Evaluation with Lightweight Verifiability Revisited", Computer Security Symposium 2010, 2010, Total 6 pages (with English Abstract).

(Continued)

*Primary Examiner* — Baotran N To
(74) *Attorney, Agent, or Firm* — Oblon, McClelland, Maier & Neustadt, L.L.P.

(57) ABSTRACT

A secret sharing value of a value represented by a "first target bit string" is used to obtain a secret sharing value of a value represented by a "first check bit string" obtained by setting a value of the most significant bit of the "first target bit string" to a value of a "first check bit" that is lower than the most significant bit. Here, the "first target bit string" corresponds to a null value when the most significant bit is 1 and corresponds to a real number when the most significant bit is 0. Next, the secret sharing value of the value represented by the "first check bit string" is used to obtain secret sharing values of bit values of the least significant bit to "first check bit" of the "first check bit string".

8 Claims, 10 Drawing Sheets

(56) References Cited

U.S. PATENT DOCUMENTS

| | | | |
|---|---|---|---|
| 2015/0193633 A1* | 7/2015 | Chida | G06F 21/60 726/26 |
| 2015/0358155 A1* | 12/2015 | Ikarashi | H04L 9/085 713/189 |
| 2016/0321958 A1* | 11/2016 | Ikarashi | G06F 21/60 |
| 2018/0225431 A1* | 8/2018 | Ikarashi | G06F 21/60 |

OTHER PUBLICATIONS

Ikarashi, et al., "O(I) Bits Communication Bit Decomposition and O(|p'|) Bits Communication Modulus Conversion for Small k Secret-Sharing-Based Secure Computation", Computer Security Symposium 2013, Oct. 2013, Total 8 pages (with English Abstract).

Ikarashi, et al., "An Improvement of Secure Sorting toward 1 sec. Response on Internet", The 31$^{st}$ Symposium on Cryptography and Information Security , Jan. 21-24, 2014, Total 9 pages (with English Abstract).

Hamada, et al., "A linear time sorting Algorithm on Secure Function Evaluation", The 2011 Symposium on Cryptography and Information Security, Jan. 25-28, 2011, Total 7 pages.

Hamada, et al., "Oblivious Radix Sort: An Efficient Sorting Algorithm for Practical Secure Multi-party Computation", Total 19 pages.

Cramer, et al., "Share Conversion, Pseudorandom Secret-Sharing and Applications to Secure Computation," J. Kilian (Ed.), TCC 2005, vol. 3378, Lecture Notes in Computer Science, Springer, 2005, pp. 342-362.

Damgard, et al., "Unconditionally Secure Constant-Rounds Multi-party Computation for Equality, Comparison, Bits and Exponentiation," S. Halevi and T. Rabin (Eds.), TCC 2006, vol. 3876 Lecture Notes in Computer Science, Springer, 2006, pp. 285-304.

International Search Report dated Aug. 9, 2016 in PCT/JP2016/67529 filed Jun. 13, 2016.

Extended European Search Report dated Jan. 7, 2019 in Patent Application No. 16814208.1, 8 pages.

Tord Ingolf Reistad, et al., "Secret Sharing Comparison by Transformation and Rotation" Serious Games, vol. 4883, XP055537327, Jan. 1, 2009, pp. 169-180.

Takashi Nishide, et al., "Multiparty Computation for Interval, Equality, and Comparison Without Bit-Decomposition Protocol" Public Key Cryptography—PKG 2007, LNCS, Springer, XP047029618, Apr. 16, 2007; pp. 343-360.

"Multiparty Computation Using Secret Sharing", D9.1 Secure Computation Models and Frameworks, XP008183298, Jul. 1, 2008, pp. 48-92.

Naoto Kiribuchi, et al., "Accelerating Multiparty Computation by Efficient Random Number Bitwise-Sharing Protocols", LNCS, Springer, XP047396908, Aug. 22, 2011, pp. 187-202.

* cited by examiner

SECURE COMPUTATION APPARATUS, SECURE COMPUTATION METHOD AND PROGRAM

TECHNICAL FIELD

The present invention relates to a secure computation technique, and in particular to a technique for doing a null value check by secure computation.

BACKGROUND ART

A technique for handling signed numbers using secure computation is known (see, for example, "Non-patent Literature 1" and the like).

PRIOR ART LITERATURE

Non-Patent Literature

Non-patent literature 1: D. Bogdanov, M. Niitsoo, T. Toft, and J. Willemson, "High-performance secure multi-party calculation for data mining applications," Int. J. Inf. Sec., 11(6): 403-418, 2012.

SUMMARY OF THE INVENTION

Problems to be Solved by the Invention

The conventional technique described above has a problem that an amount of communication and the number of communication stages are large. Further, doing a null value check by secure computation is not referred to.

A subject of the present invention is to improve efficiency of a null value check by secure computation.

Means to Solve the Problems

A secret sharing value of a value represented by a "first target bit string" is used to obtain a secret sharing value of a value represented by a "first check bit string" obtained by setting a value of the most significant bit of the "first target bit string" to a value of a "first check bit" that is lower than the most significant bit. Here, the "first target bit string" corresponds to a null value when the most significant bit is 1 and corresponds to a real number when the most significant bit is 0. Next, the secret sharing value of the value represented by the "first check bit string" is used to obtain secret sharing values of bit values of the least significant bit to "first check bit" of the "first check bit string".

Effects of the Invention

From the above, efficiency of a null value check by secure computation can be improved.

DETAILED DESCRIPTION OF THE EMBODIMENTS

Figure 1:
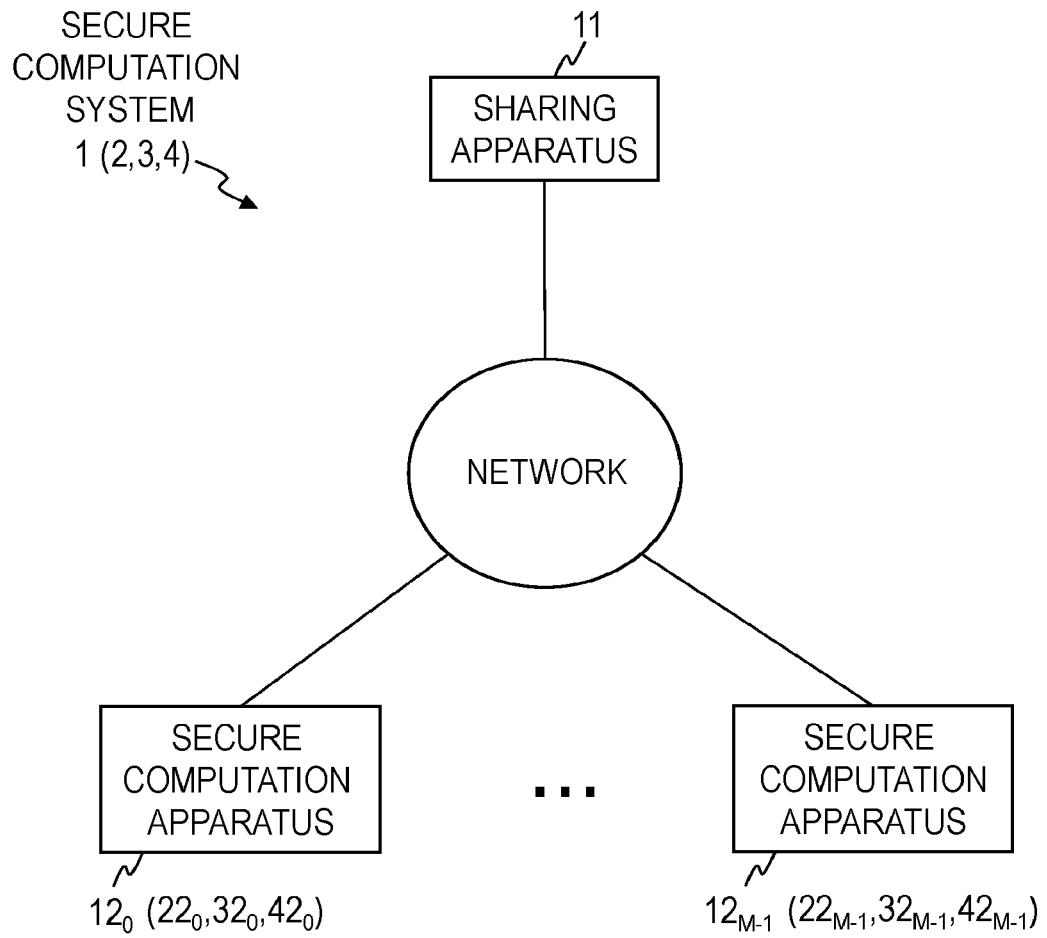
FIG. 1 is a block diagram illustrating a configuration of a secure computation system of embodiments.

Embodiments of the present invention will be described below.

[Summary]

First, a summary will be described. A secure computation apparatus of each embodiment obtains a secret sharing value of a value represented by a "first check bit string" obtained by setting a value of the most significant bit of a "first target bit string" to a value of a "first check bit" that is lower than the most significant bit, using a secret sharing value of a value of the "first target bit string". Here, the "first target bit string" corresponds to a null value when the most significant bit is 1 and corresponds to a real number (real value) when the most significant bit is 0. The "first check bit string" is obtained, for example, by rotation of the "first target bit string". The rotation can be realized by multiplication in a factor ring. A method for multiplication on a factor ring by secure computation is not limited and can be realized by a well-known method (see, for example, Reference Literature 1: Koji Chida, Koki Hamada, Dai Igarashi and Katsumi Takahashi, "A Three-Party Secure Function Evaluation with Lightweight Verifiability Revisited", CSS2010, 2010). This is, however, a mere example, and any other method may be used if the value of the most significant bit of the "first target bit string" can be set to the value of the "first check bit". Next, the secure computation apparatus obtains secret sharing values of bit values of the least significant bit to "first check bit" of the "first check bit string", using the secret sharing value of the value represented by the "first check bit string". Here, when the "first target bit string" corresponds to a null value, the value of the "first check bit" is "1". When the first target bit string" corresponds to a real number, the value of the "first check bit" is "0". Therefore, the secret sharing value of the value of the "first check bit" is a secret sharing value of a value representing a null value check result. Further, since it is necessary to obtain only the secret sharing values of the bit values of the least significant bit to "first check bit" of the "first check bit string", an amount of communication and/or the number of communication stages can be reduced in comparison with a case of obtaining secret sharing values of all the bits to obtain the secret sharing value of the value representing the null value check result. Further, the closer to the least significant bit the "first check bit" is, the more the number of bits targeted by secure computation can be reduced, and the more an amount of communication and/or the number of communication stages can be reduced. Therefore, it is desirable that the "first check bit" is the least significant bit. As a well-known method for obtaining the secret sharing values of the bit values of the least significant bit to "first check bit" of the "first check bit string", for example Reference Literature 2, the following is given: "O(1) Bits Communication Bit Decomposition and O(|p'|) Bits Communication Modulus Conversion for Small k Secret-Sharing-Based Secure Computation" by Dai Igarashi, Koki Hamada, Ryo Kikuchi and Koji Chida, CSS2013, 2013. In this method, it is possible to efficiently obtain a secret sharing value of each of bit values of a least significant bit to a desired bit. Though the method for efficiently obtaining only a secret sharing value of each of bit values of a least significant bit to a desired bit is known, a method for efficiently obtaining only a secret sharing value of each of bit values of a most significant bit to a desired bit or a method for efficiently obtaining only secret sharing values of bit values existing between a most significant bit and a least significant bit is not known. A scheme of the present embodiments improves efficiency of a null value check by secure computation, paying attention to this point.

The configuration described above can be realized on a factor ring modulo Mersenne number $P=2^N-1$. For example, it is assumed that a secret sharing value [W] of an input value W is inputted to each secure computation apparatus. Here, N is an integer equal to or larger than 2, and P is the Mersenne number $P=2^N-1$, and P may be a Mersenne prime depending on a value of N. A value W corresponding to a null value is represented by $W=(P+1)/2 \mod P$; a value W corresponding to an integer X equal to or larger than 0 is represented by $W=X \mod P$; and a value W corresponding to a negative integer X is represented by $W=(P+X) \mod P$. Further, L is an integer satisfying $0 \le L \le N-u'$, and X is an integer satisfying $-2^L \le X \le 2^{N-1}-2^L-1$. Here, u' is a positive integer equal to or larger than 2 and equal to or smaller than N, according to a secret sharing scheme. For example, in the case of Shamir's Secret Sharing Scheme of 2-out-of-3, $u'=2$ is satisfied. In this case, the integer X, which is an integer equal to or larger than 0, corresponds to a small input value W; the negative integer X corresponds to a large input value W; and "X being a null value" corresponds to an input value W between the small input value W and the large input value W. Each secure computation apparatus obtains a secret sharing value [Y] of $Y=(W+2^L) \mod P$ using the secret sharing value [W] of the input value W. This operation is addition on a factor ring by secure computation. A method for addition in a factor ring by secure computation is not limited, and the addition can be realized by a well-known method (see, for example, "Reference Literature 1" and the like). Here, Y is $Y=\{2^L+(P+1)/2\} \mod P$ for a null value, $Y=(2^L+X) \mod P$ for the integer X equal to or larger than 0, and $Y=(P+2^L+X) \mod P$ for the negative integer X. Here, due to a nature of the Mersenne number $P=2^N-1$, the most significant bit of a bit string with N bits representing Y corresponding to a null value is 1, and the most significant bit of a bit string with N bits representing Y corresponding to a real number X (the integer X equal to or larger than 0 or the negative integer X) is 0. As far as the condition of $-2^L \le X \le 2^{N-1}2^L-1$ is satisfied, it does not happen that different real numbers X correspond to the same Y. The bit string with N bits representing such Y can be set as the "first target bit string". In this case, a value represented by the "first check bit string" can be represented by $V=2^T \times Y \mod P$, and the T-th bit from the least significant bit can be set as the "first check bit". Here, T is an integer satisfying $1 \le T < N$. Here, T=1 is desirable, and, in this case, the "first check bit" is the least significant bit (specific examples of formats of the "first target bit string" and the "first check bit string").

In addition to the null value check by secure computation described above, magnitude comparison may be performed by secure computation. In this case, each secure computation apparatus obtains a secret sharing value of a "comparison result value" and obtains a secret sharing value of a value of the K-th bit from the least significant bit of a bit string representing the "comparison result value". Here, the "comparison result value" indicates a value obtained by adding $2^{K-1}$ to a value obtained by subtracting a value represented by a "second target bit string" from the value represented by the "first target bit string". The "second target bit string" is a bit string that corresponds to a null value when the most significant bit is 1 and corresponds to a real number when the most significant bit is 0. Further, K is an integer equal to or larger than 2, and magnitudes of a value represented by the first target bit string the most significant bit of which is 0 and a value represented by the second target bit string the most significant bit of which is 0 is equal to or larger than 0 and below $2^{K-1}$.

Addition/subtraction by secure computation and extraction of a bit value can be realized by a well-known method (see, for example, "Reference Literature 1 and 2" and the like). Here, when the value represented by the "first target bit string" is equal to or larger than the value represented by the "second target bit string", the value of the K-th bit from the least significant bit of the bit string representing the "comparison result value" is 1. On the other hand, when the value represented by the "first target bit string" is smaller than the value represented by the "second target bit string", the value of the K-th bit from the least significant bit of the bit string representing the "comparison result value" is "0". That is, the value of the K-th bit from the least significant bit representing the "comparison result value" indicates a result of magnitude comparison between the value represented by the "first target bit string" and the value represented by the "second target bit string".

A null value check by secure computation may be done for the "second target bit string". That is, each secure computation apparatus may obtain a secret sharing value of a value represented by a "second check bit string" obtained by setting a value of the most significant bit of the "second target bit string" to a value of a "second check bit" that is lower than the most significant bit using the secret sharing value represented by the "second target bit string", and a secret sharing value of the "second check bit" using the secret sharing value represented by the "second check bit string". Specific examples of formats of the "second target bit string" and the "second check bit string" are the same as the specific examples of the formats of the "first target bit string" and the "first check bit string" described before.

In addition to the null value check by secure computation described above, sorting by secure computation may be performed. In this case, each secure computation apparatus obtains a secret sharing value of a value represented by a "check bit string C(d)" obtained by setting a value of the most significant bit of a "target bit string A(d)" to a value r(d) of a "check bit" that is lower than the most significant bit, using a secret sharing value of a value represented by the "target bit string A(d)". Here, d=0, . . . , D−1 is satisfied, and D is an integer equal to or larger than 2. The "target bit string A(d)" corresponds to a null value when the most significant bit is 1 and corresponds to a real number when the most significant bit is 0. Each secure computation apparatus obtains secret sharing values of bit values of the least significant bit of the "check bit string C(d)" to the "target bit string A(d)", using secret sharing values of a value represented by a "check bit string C(d)". Furthermore, each secure computation apparatus obtains a secret sharing value of a sorting result corresponding to a magnitude of the value represented by the "target bit string A(d)". Here, a value represented by the "target bit string A(d)" the most significant bit of which is 0 corresponds to a larger real number as the value represented by the "target bit string A(d)" is larger. Each secure computation apparatus may obtain a secret sharing value of a sorting result corresponding to a magnitude of the value represented by the "check bit string C(d)". Here, a value represented by the "check bit string C(d)" corresponding to the "target bit string A(d)" the most significant bit of which is 0, corresponds to a larger real number as the value represented by the "check bit string C(d)" is larger. Furthermore, a secret sharing value of at least any of a maximum value, a minimum value and a median may be obtained using the sorting result by secure computation. A method for sorting by secure computation is not limited, and any well-known method may be adopted (see, for example, Reference Literature 3: Dai Igarashi, Koki Hamada, Ryo Kikuchi and Koji Chida, "An Improvement of Secure Sorting toward 1 sec. Response on Internet", SCIS2014, 2014; Reference Literature 4: Koki Hamada, Dai Igarashi, Koji Chida and Katsumi Takahashi, "A Linear Time Sorting Algorithm on Secure Function Evaluation", CSS2011, 2011; and the like).

First Embodiment

Hereinafter, each embodiment will be described with reference to drawings.
<Configuration>
As illustrated in FIG. 1, a secure computation system 1 of a first embodiment has a sharing apparatus 11 and M secure computation Mapparatuses $\mathbf{12}_0\text{-}\mathbf{12}_{M-1}$, and these are configured to be communicable via a network such as the Internet. Here, M is an integer equal to or larger than 2. Though it is assumed that the secure computation system 1 has only one sharing apparatus 11 for convenience of description, a plurality of sharing apparatuses 11 may exist. Otherwise, other secure computation apparatuses may exist.

Figure 2:
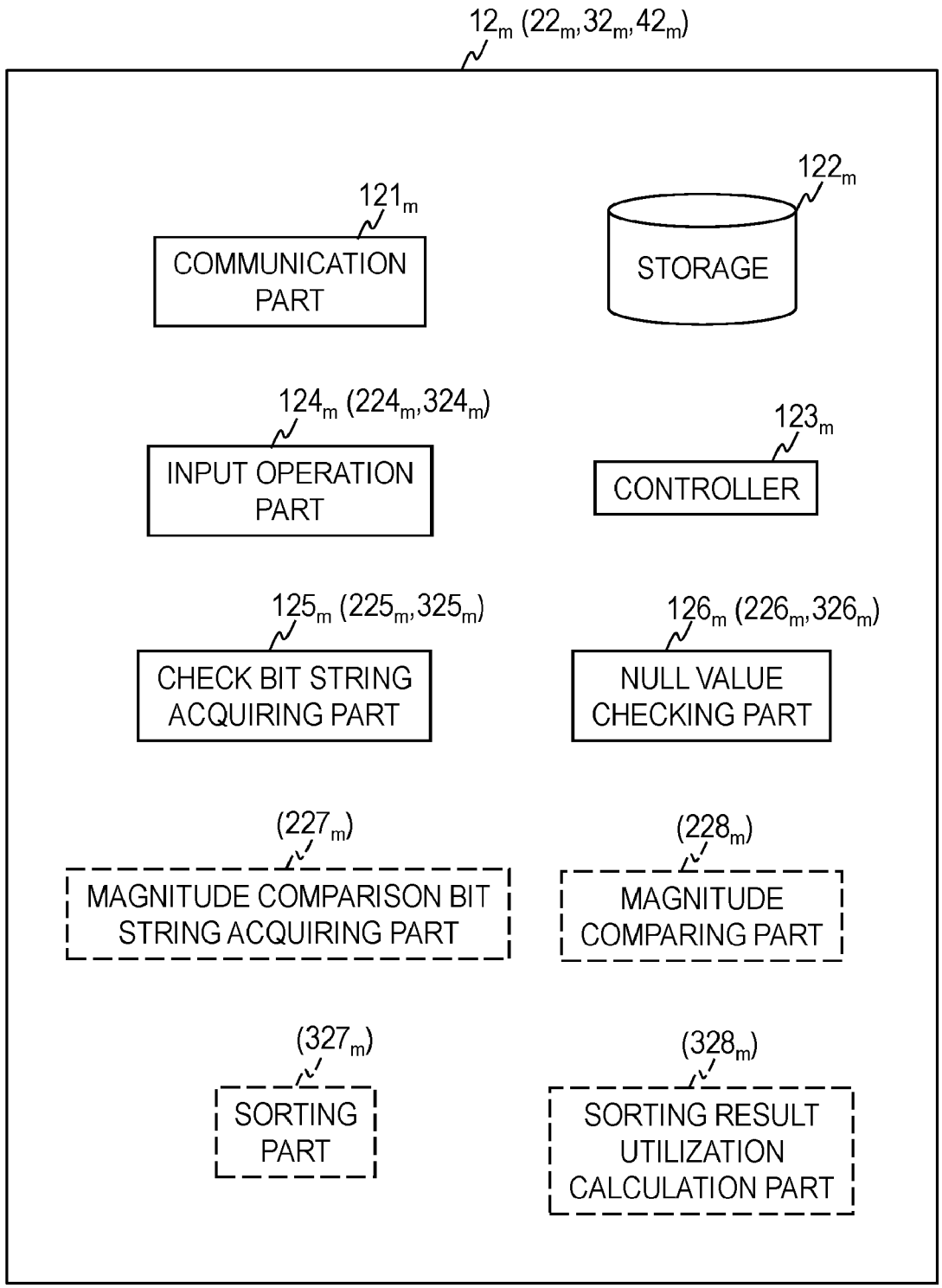
FIG. 2 is a block diagram illustrating a configuration of a secure computation apparatus of the embodiments.

As illustrated in FIG. 2, the secure computation apparatus $\mathbf{12}_m$ (m=0, . . . , M-1) of the present embodiment has a communication part $\mathbf{121}_m$, a storage $\mathbf{122}_m$, a controller $\mathbf{123}_m$, an input operation part $\mathbf{124}_m$, a check bit string acquiring part $\mathbf{125}_m$ and a null value checking part $\mathbf{126}_m$. The secure computation apparatus $\mathbf{12}_m$ executes each process under control of the controller $\mathbf{123}_m$. Data obtained by each part is stored into a temporary memory (not shown) and read out and used as necessary.

Figure 3:
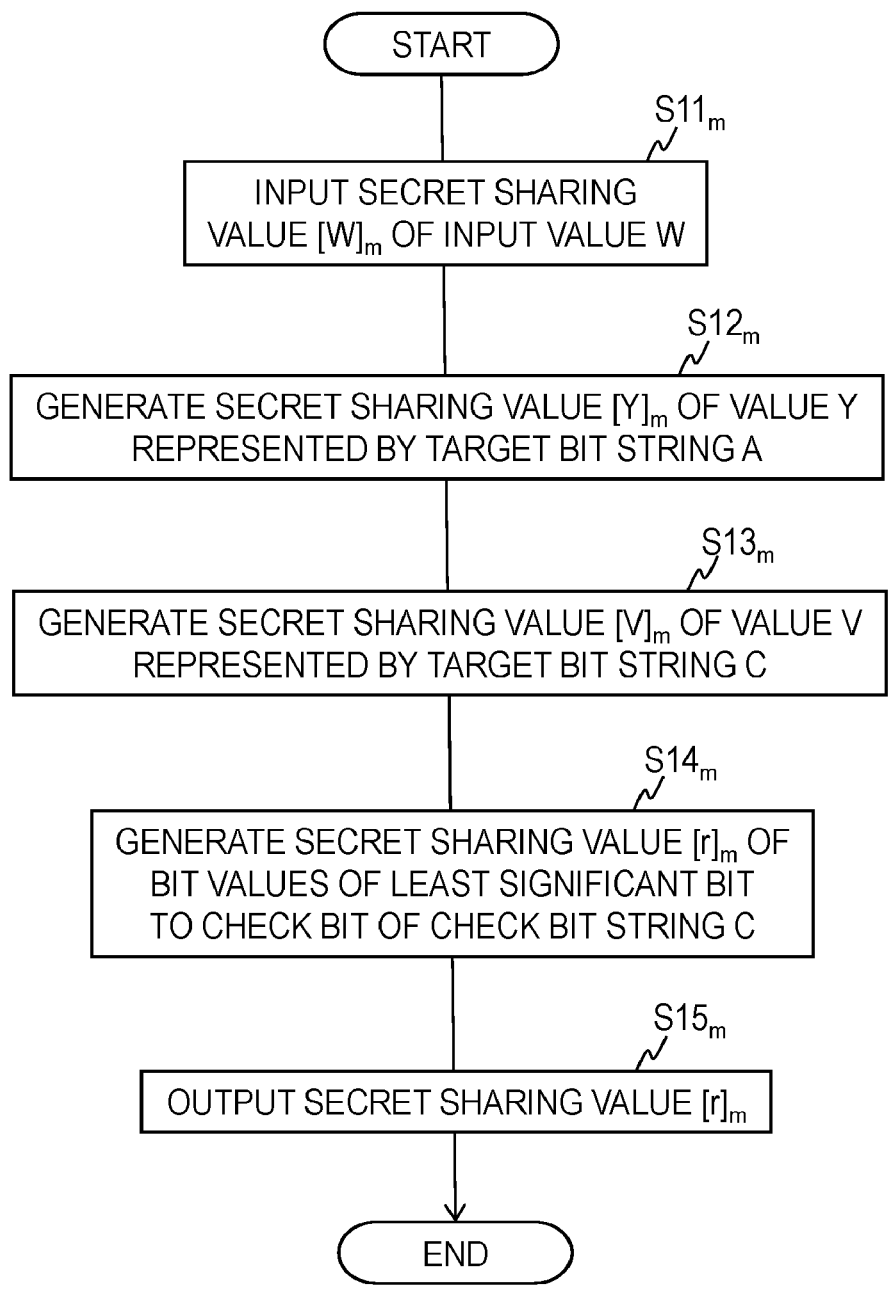
FIG. 3 is a flowchart for illustrating a process of a first embodiment.

For example, each apparatus is configured by a general-purpose or dedicated computer, which is provided with a processor (a hardware processor) such as a CPU (central processing unit), a memory such as a RAM (random-access memory) and a ROM (read-only memory) and the like, executing a predetermined program. This computer may be provided with one processor and one memory or may be provided with a plurality of processors and memories. This program may be installed in the computer or may be recorded in a ROM or the like in advance. Further, a part of or all of the processing parts may be configured with a circuitry realizing processing functions without using a program, instead of a circuitry realizing functional configurations by the program being read in like a CPU. Further, a circuitry constituting one apparatus may comprise a plurality of CPUs.
<Process>
Next, a process of the present embodiment will be described with reference to FIG. 3. The sharing apparatus 11 generates a secret sharing value $[W]_m$ of an input value W and transmits the secret sharing value $[W]_m$ to the secure computation apparatus $\mathbf{12}_m$ (m=0, . . . , M-1). A format of the input value W of the present embodiment is as shown below (see FIG. 4):

(1) a value corresponding to a null value is W=(P+1)/2 mod P;

(2) a value corresponding to X that is an integer equal to or larger than 0 is W=X mod P; and (3) a value corresponding to X that is a negative integer is W=(P+X) mod P.

Here, N is an integer equal to or larger than 2; P is a Mersenne number $P=2^N-1$ (P is an integer represented as a decimal number); L is an integer satisfying $0 \leq L \leq N-u'$; and X is an integer satisfying $-2^L \leq X \leq 2^{N-1}-2^L-1$ (X is an integer represented as a decimal number). Here, P may be or may not be a prime (a Mersenne prime), and u' is a positive integer equal to or larger than 2 and equal to or smaller than N according to a secret sharing scheme. A bit string representing the input value W by an N-digit binary number is called an input bit string. In the case of N=7, u'=2 and L=5, the input bit string is as below:

TABLE 1

| X | INPUT BIT STRING |
|---|---|
| NULL VALUE | 1000000 |
| 31 | 0011111 |
| 30 | 0011110 |
| 20 | 0010100 |
| 10 | 0001010 |
| 5 | 0000101 |
| 0 | 0000000 |
| -1 | 1111110 |
| -5 | 1111010 |
| -10 | 1110101 |
| -20 | 1101011 |
| -30 | 1100001 |
| -32 | 1011111 |

The secret sharing scheme is not limited, and a linear secret sharing scheme such as Shamir's Secret Sharing Scheme, a replicated secrete sharing scheme and any other schemes (see, for example, "Reference Literature 2") are possible. The secret sharing value $[W]_m$ is received by the communication part $\mathbf{121}_m$ of the secure computation apparatus $\mathbf{12}_m$ (FIG. 2) and sent to the input operation part $\mathbf{124}_m$ (step $S\mathbf{11}_m$).

Figure 4:
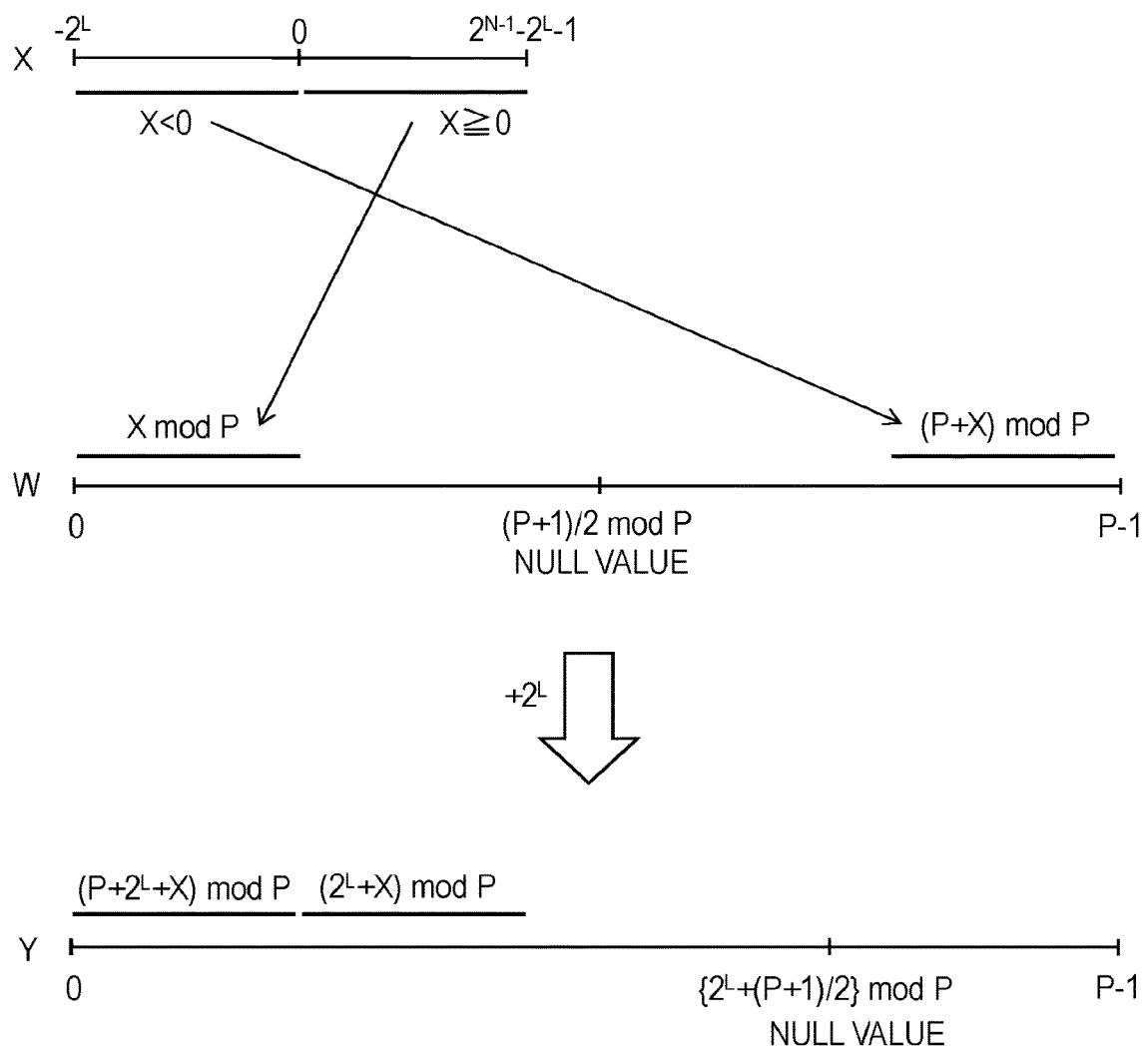
FIG. 4 is a conceptual diagram for illustrating a process of the embodiments.
Figure 5A:
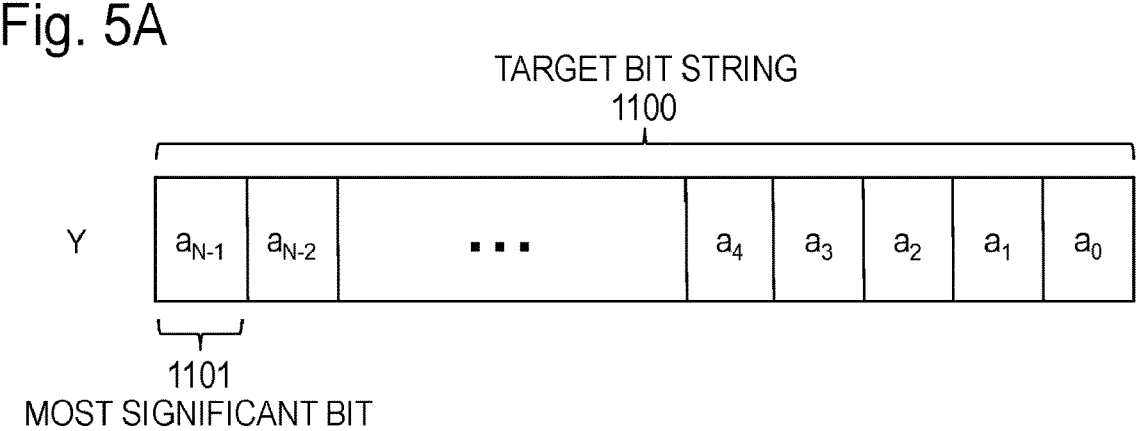
FIG. 5A is a conceptual diagram for illustrating a configuration of a target bit string of the embodiments.

The input operation part $\mathbf{124}_m$ obtains a secret sharing value $[Y]_m$ of $Y=(W+2^L)$ mod P by secure computation, using the secret sharing value $[W]_m$ of the input value W, and outputs the secret sharing value $[Y]_m$. Here, Y corresponding to a null value is $\{2^L+(P+1)/2\}$ mod P; Y corresponding to X that is an integer equal to or larger than 0 is $(2^L+X)$ mod P; and Y corresponding to X that is a negative integer is $(P+2^L+X)$ mod P (FIG. 4). A bit string representing Y as an N-digit binary number is called a target bit string. When Y corresponds to a null value, a most significant bit 1101 of a target bit string 1100 is $a_{N-1}=1$ (FIG. 5A). When Y corresponds to a real number X (an integer satisfying $-2^L \leq X \leq 2^{N-1}-2^L-1$), the most significant bit 1101 of the target bit string 1100 is $a_{N-1}=0$. This characteristic is based on that P is a Mersenne number. For example, in the case of N=7 and L=5, the target bit string 1100 is as follows (step $S\mathbf{12}_m$).

TABLE 2

| X | TARGET BIT STRING |
|---|---|
| NULL VALUE | 1100000 |
| 31 | 0111111 |
| 30 | 0111110 |
| 20 | 0110100 |
| 10 | 0101010 |
| 5 | 0100101 |
| 0 | 0100000 |
| −1 | 0011111 |
| −5 | 0011011 |
| −10 | 0010110 |
| −20 | 0001100 |
| −30 | 0000010 |
| −32 | 0000000 |

Figure 5B:
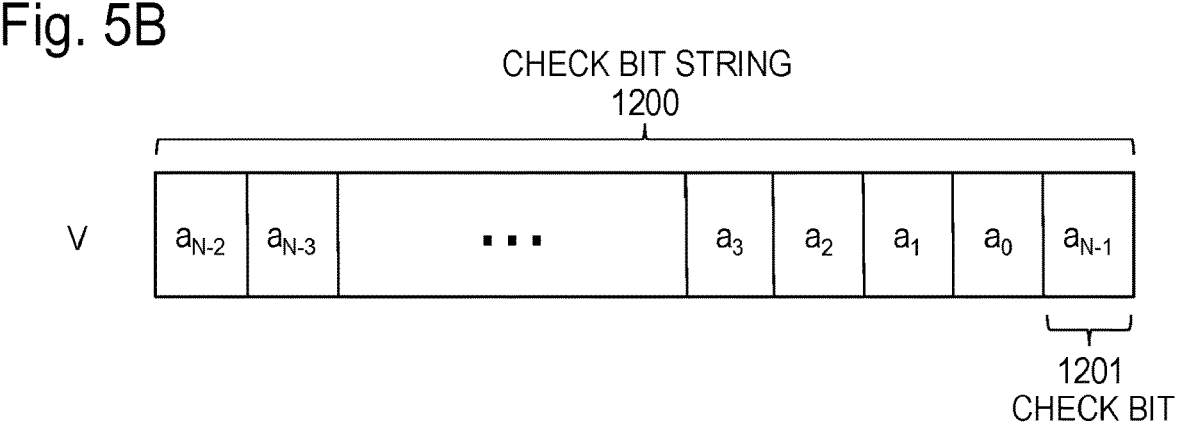
FIGS. 5B and 5C are conceptual diagrams for illustrating a configuration of a check bit string of the embodiments.
Figure 5C:
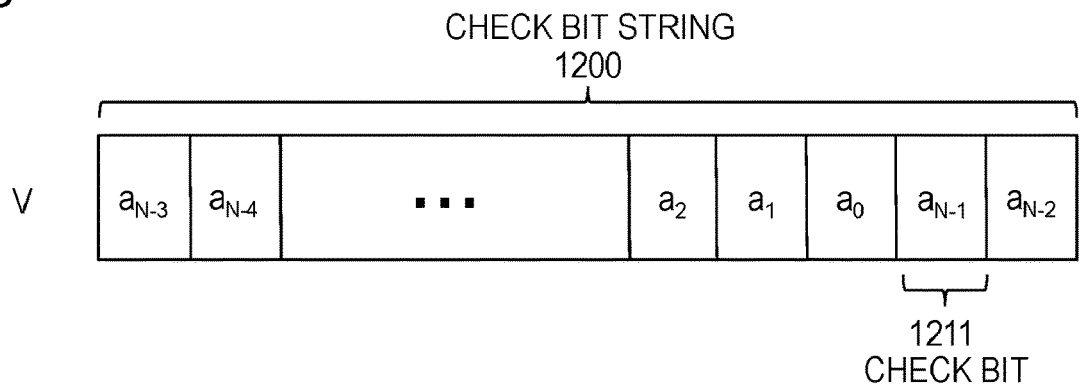

The check bit string acquiring part $125_m$ obtains a secret sharing value $[V]_m$ of $V=2^T \times Y \bmod P$ by secure computation, with the secret sharing value $[Y]_m$ of Y as an input, and outputs the secret sharing value $[V]_m$. Here, "T" is an integer satisfying $1 \leq T < N$. A bit string representing V as an N-digit binary number is called a check bit string. The check bit string is a bit string obtained by rotating the target bit string 1100 left by T bits. The value $a_{N-1}$ of the most significant bit 1101 of the target bit string 1100 is a value of a bit (a check bit) lower than the most significant bit of the check bit string. FIG. 5B shows an example in the case of T=1, and the least significant bit (the first bit from the least significant bit) of a check bit string 1200 is a check bit 1201. FIG. 5C shows an example in the case of T=2, and the second bit from the least significant bit of the check bit string 1200 is a check bit 1211. For example, in the case of N=7 and L=5, the check bit is as follows.

TABLE 3

| IN THE CASE OF T = 1 | | IN THE CASE OF T = 2 | |
|---|---|---|---|
| X | CHECK BIT STRING | X | CHECK BIT STRING |
| NULL VALUE | 1000001 | NULL VALUE | 0000011 |
| 31 | 1111110 | 31 | 1111101 |
| 30 | 1111100 | 30 | 1111001 |
| 20 | 1101000 | 20 | 1010001 |
| 10 | 1010100 | 10 | 0101001 |
| 5 | 1001010 | 5 | 0010101 |
| 0 | 1000000 | 0 | 0000001 |
| −1 | 0111110 | −1 | 1111100 |
| −5 | 0110110 | −5 | 1101100 |
| −10 | 0101100 | −10 | 1011000 |
| −20 | 0011000 | −20 | 0110000 |
| −30 | 0000100 | −30 | 0001000 |
| −32 | 0000000 | −32 | 0000000 |

Thus, a value of the T-th bit from the least significant bit of the check bit string 1200 indicates "whether X is a null value or not". Here, "the T-th bit from the least significant bit" means the T-th bit when bits are counted from the least significant bit. For example, "the first bit from the least significant bit" means the least significant bit, and "the second bit from least significant bit" means a bit one digit higher than the least significant bit.

The null value checking part $126_m$ obtains a secret sharing value $[r]_m$ of each of bit values of the least significant bit to check bit of the check bit string 1200, with the secret sharing value $[V]_M$ of V as an input, and outputs the secret sharing value $[r]_m$. For example, in the case of T=1, the null value checking part $126_m$ obtains and outputs a secret sharing value $[r]_m$ of a value of the check bit that is the least significant bit (step $S14_m$ and $S15_m$).

<<Example of Using Bit Decomposition of Reference Literature 2>>

An example of using bit decomposition of Reference Literature 2 will be shown. In this example, a secret sharing value $[V]_m$ in accordance with a replicated secret sharing scheme is used. A secret sharing value in accordance with any linear secret sharing scheme can be converted to a secret sharing value of the replicated secret sharing scheme (see, for example, Reference Literature 5: R. Cramer, I. Damgard, and Y. Ishai, "Share conversion, pseudorandom secret-sharing and applications to secure computation," In J. Kilian ed., TCC, Vol. 3378 of Lecture Notes in Computer Science, pp. 342-362. Springer, 2005, and the like). Therefore, limitation to the replicated secret sharing scheme is not restriction on use.

In this example, a linear secret sharing value of V is represented as [V], and a replicated secret sharing value of V is represented as {V}. The number of sub-shares of V is represented by v, and a boundary value u, which is a natural number, is assumed to be a minimum integer equal to or larger than log v. Here, v is an integer satisfying $v \leq 2^u$. It is assumed that V is congruent with O module $2^u$, and V is congruent with a sum $x_0 + \ldots + x_{v-1}$ of sub-shares $x_0, \ldots, x_{v-1}$ module P. Though P in this example is a Mersenne prime, P may be other Mersenne numbers. In this example, $2^u v < P$ is assumed. It is assumed that i is an integer satisfying $i=0, 1, \ldots, v-1$, and j is an integer satisfying $j=0, 1, \ldots, v-1$. For any proposition PRO, [PRO] is an operator to convert true/false of PRO to an integer.

A public-value-double secure computation part of the null value checking part $126_m$ of this example acquires a replicated secret sharing value $\{V\}^{ZP}$ and calculates a transformed secret sharing value $\{V'\}^{ZP} = 2^u \times_{ZP} \{V\}^{ZP}$ by a public value multiplication on secure computation. Here, $\{\bullet\}^{ZP}$ indicates a replicated secret sharing value, which is a source of $Z_P$, and "$\times_{ZP}$" indicates multiplication on $Z_p$. For all of i satisfying i<v, a lower-bit sharing part of the null value checking part $126_m$ shares each of u bits from the least significant bit (u bits from the least significant bit to the u-th bit from the least significant bit) of the j-th sub-share $\{V'\}^{ZP}<j>$ of the transformed secret sharing value $\{V'\}^{ZP}$ and acquires a lower-bit sharing value represented by the following formula:

$$[\eta_i]^{Z_2^u}$$

Here, $[\bullet]^\alpha$ indicates a linear secret sharing value that is a source of α. For all of i satisfying i<v, an upper-bit sharing part of the null value checking part $126_m$ shares each of T bits from the u-th bit of the j-th sub-share $\{V\}^{ZP}<j>$ of the transformed secret sharing value and acquires a upper-bit sharing value represented by the following formula:

$$[q_i]^{Z_2^T}$$

A lower bit adding part of the null value checking part $126_m$ calculates a lower-bit addition value represented by the following formula by an addition circuit on secure computation.

$$\sum_{i<v} z_{2^{2u}}[\eta_i]^{Z_2^u}$$

In the lower-bit addition value, lower u bits are represented by the following formula:

$$[\eta_u]^{Z_2^T}$$

Upper u bits are represented by the following formula;

$$[q_u]^{Z_2^u}$$

A zero judging part of the null value checking part $126_m$ acquires the lower u bits of the lower-bit addition value and calculates a zero determination value $[[\eta_u \neq 0]]^{Z_2}$ by secure computation by a zero determining circuit. For each of all of i satisfying i<v, an upper bit adding part of the null value checking part $126_m$ acquires the upper-bit addition value, the upper u bits of the lower bit addition value, and the zero determining value and calculates and outputs a secret sharing string of the bits represented by the following formula by secure computation by the addition circuit.

$$[V \bmod 2^T]^{Z_2^T}_{Z_2^T} = \sum_{i<v} z_{2^T}[q_i]^{Z_2^T}_{Z_2^T} + z_{2^T}[q_u]^{Z_2^u}_{Z_2^u} + z_{2^T}[[\eta_u \neq 0]]^{Z_2} \quad (1)$$

Here, the following formula indicates a sum total on $Z_2^T$.

$$\sum_{i<v} z_{2^T}$$

The following formula indicates addition on $Z_2^T$.

$$+_{Z_2^T}$$

By the operation of the formula (1), a secret sharing value $[r]_m$ of each of bit values of the least significant bit to the T-th bit (that is, a check bit) in the case where V is represented as an N-digit binary number is obtained. The operation of the formula (1) is executed only for the least significant bit to the T-th bit, and an amount of communication and an amount of operation therefor does not depend on the total number of bits N. In the case of T=1, it is necessary to perform the operation of the formula (1) only for the least significant bit, and efficiency is very good. Especially in three-party secure computation, it is possible to perform processing with an amount of communication of several bits and by two rounds (step $S14_m$).

The secure computation apparatus $12_m$ outputs the secret sharing value $[r]_m$ (step $S15_m$).

Modification 1 of First Embodiment

In the first embodiment, the secure computation apparatus $12_m$ outputs the secret sharing value $[r]_m$. However, even in the case of T≥2, only a secret sharing value of a value of each check bit of the check bit string C may be outputted instead of the secret sharing value $[r]_m$.

Modification 2 of First Embodiment

In the first embodiment, the secret sharing value $[W]_m$ of the input value W is inputted to each secure computation apparatus $12_m$, and each secure computation apparatus $12_m$ obtains the secret sharing value $[Y]_m$ of $Y=(W+2^L)$ mod P. However, it is also conceivable that the secret sharing value $[Y]_m$ is inputted to each secure computation apparatus $12_m$, and the process from step $S13_m$ to $S15_m$ is executed.

Second Embodiment

In a second embodiment, in addition to the null value check by secure computation, magnitude comparison by secure computation is performed. Hereinafter, points different from the items described so far will be mainly described, and, as for the items already described, the reference numerals used so far will be used, and description of the items will be simplified.

<Configuration>

As illustrated in FIG. 1, a secure computation system 2 of the second embodiment has the sharing apparatus 11 and M secure computation apparatuses $22_0$-$22_{M-1}$, and these are configured to be communicable via a network such as the Internet. As illustrated in FIG. 2, the secure computation apparatus $22_m$ (m=0, . . . , M−1) of the present embodiment has the communication part $121_m$, the storage $122_m$, the controller $123_m$, an input operation part $224_m$, a check bit string acquiring part $225_m$, a null value checking part $226_m$, a magnitude comparison bit string acquiring part $227_m$ and a magnitude comparing part $228_m$. The secure computation apparatus $22_m$ executes each process under control of the controller $123_m$.

<Process>

Figure 6:
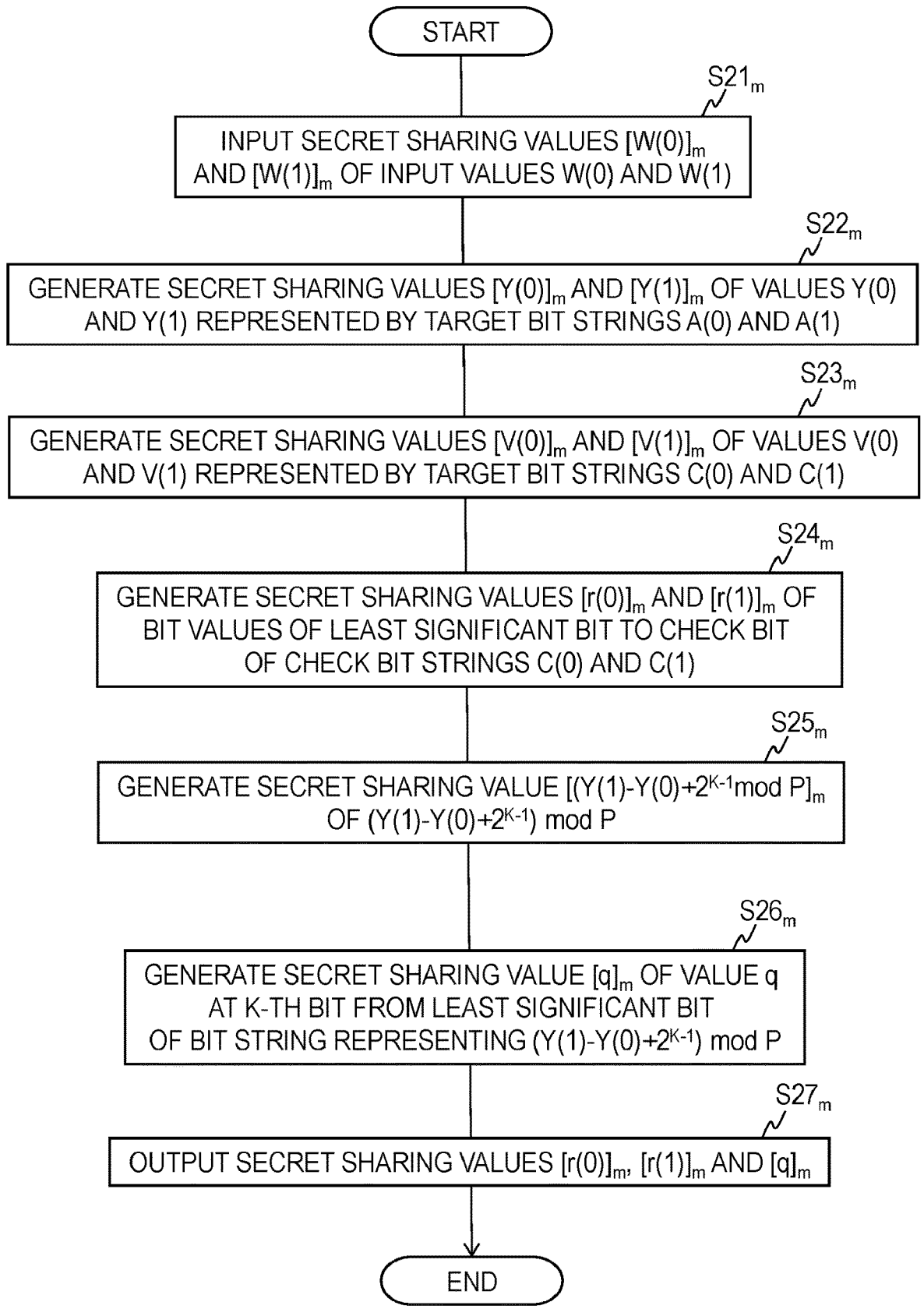
FIG. 6 is a flowchart for illustrating a process of a second embodiment.

Next, a process of the present embodiment will be described with reference to FIG. 6.

The sharing apparatus 11 generates a secret sharing value $[W(0)]_m$ of an input value W(0) and a secret sharing value $[W(1)]_m$ of an input value W(1) and transmits the secret sharing values $[W(0)]_m$ and $[W(1)]_m$ to the secure computation apparatus $22_m$ (m=0, . . . , M−1). The input value W(O) corresponds to a null value or a real number X(O), and the input value W(1) corresponds to a null value or a real number X(1). Formats of the input values W(0) and W(1) are the same as the format of the input value W described before. The secret sharing values $[W(0)]_m$ and $[W(1)]_m$ are received by the communication part $121_m$ of the secure computation apparatus $22_m$ (FIG. 2) and sent to the input operation part $124_m$ (step $S21_m$).

The input operation part $224_m$ obtains a secret sharing value $[Y(0)]_m$ of $Y(0)=(W(0)+2^L)$ mod P by secure computation, using the secret sharing value $[W(0)]_m$ of the input value W(O), and outputs the secret sharing value $[Y(0)]_m$. The input operation part $224_m$ obtains a secret sharing value $[Y(1)]_m$ of $Y(1)=(W(1)+2^L)$ mod P by secure computation, using the secret sharing value $[W(1)]_m$ of the input value W(1), and outputs the secret sharing value $[Y(1)]_m$. Here, Y(0) corresponds to "a value represented by a target bit string A(0)", and Y(1) corresponds to "a value represented by a target bit string A(1)". The target bit strings A(0) and A(1) are bit strings that corresponds to a null value when the most significant bit is 1 and corresponds to a real number when the most significant bit is 0 (step $S22_m$).

The check bit string acquiring part $225_m$ obtains a secret sharing value $[V(0)]_m$ of $V(0)=2^T \times Y(0)$ mod P and a secret sharing value $[V(1)]_m$ of $V(1)=2^T \times Y(1)$ mod P by secure computation, with the secret sharing values $[Y(0)]_m$ and $[Y(1)]_m$ as an input, and outputs the secret sharing values $[V(0)]_m$ and $[V(1)]_m$. Here, V(0) corresponds to "a value represented by a check bit string C(0)", and V(1) corresponds to "a value represented by a check bit string C(1)" (step $S23_m$).

The null value checking part $226_m$ obtains a secret sharing value $[r(0)]_m$ of each of bit values of the least significant bit to check bit of the check bit string C(0), with the secret sharing value $[V(0)]_m$ as an input, and outputs the secret sharing value $[r(0)]_m$. Further, the null value checking part $226_m$ obtains a secret sharing value $[r(1)]_m$ of each of bit values of the least significant bit to check bit of the check bit string C(1), with the secret sharing value $[V(1)]_m$ as an input, and outputs the secret sharing value $[r(1)]_m$. For example, in the case of T=1, the null value checking part $226_m$ obtains and outputs the secret sharing values $[r(0)]_m$ and $[r(1)]_m$ of values of the check bits that are the least significant bits (step $S24_m$).

Figure 7A:
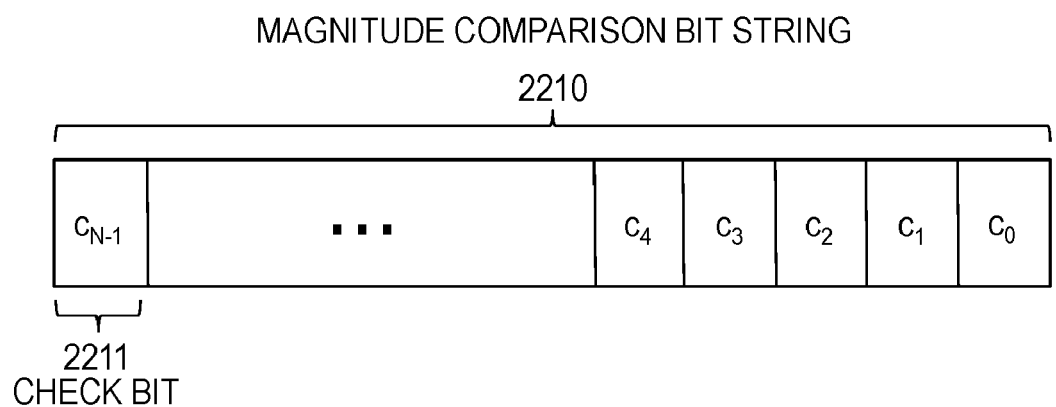
FIGS. 7A and 7B are conceptual diagrams for illustrating a configuration of a magnitude comparison bit string of the embodiments.
Figure 7B:
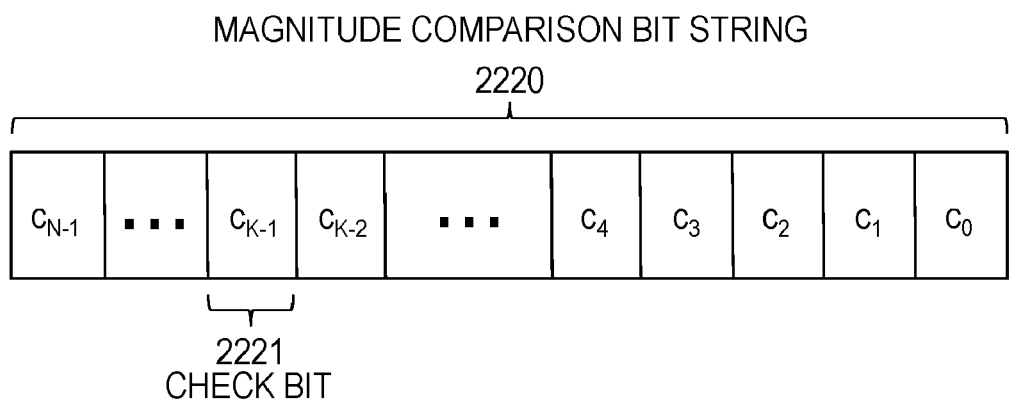
Figure 8:
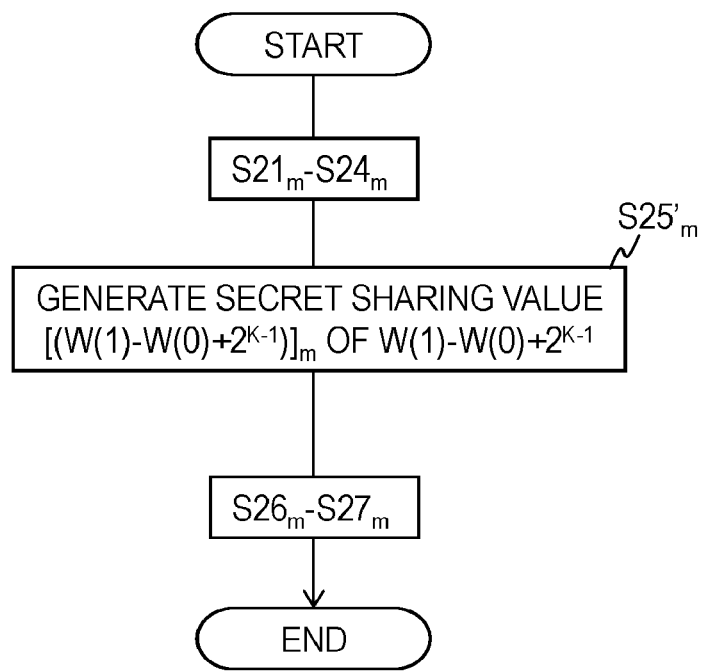
FIG. 8 is a flowchart for illustrating a process of a modification 1 of the second embodiment.

The magnitude comparison bit string acquiring part $227_m$ obtains a secret sharing value $[(Y(0)-Y(1)+2^{K-1}) \bmod P]_m$ of a comparison result value $(Y(0)-Y(1)+2^{K-1}) \bmod P$ (a value obtained by adding $2^{K-1}$ to a value obtained by subtracting a value represented by the target bit string $A(1)$ from a value represented by the target bit string $A(0)$) by secure computation, with the secret sharing values $[Y(0)]_m$ and $[Y(1)]_m$ as an input, and outputs the secret sharing value $[(Y(0)-Y(1)+2^{K-1}) \bmod P]_m$. Here, K is an integer equal to or larger than 2, and magnitudes of the value $Y(0)$ represented by the target bit string $A(0)$ the most significant bit of which is 0 and the value $Y(1)$ represented by the target bit string $A(1)$ the most significant bit of which is 0 are equal to or larger than 0 and smaller then $2^{K-1}$. Here, a bit string that is an N-digit binary expression of the comparison result value $(Y(0)-Y(1)+2^{K-1}) \bmod P$ is called a magnitude comparison bit string. FIG. 7A is a conceptual diagram illustrating a magnitude comparison bit string 2210 in the case of N=K, and the most significant bit is set as a check bit 2211. FIG. 7B is a conceptual diagram illustrating a magnitude comparison bit string 2220 in the case of N>K, and a bit lower than the most significant bit is set as a check bit 2221.

A value of the K-th bit from the least significant bit of an N-digit binary expression value of $2^{K-1} \bmod P$ is 1. Here, since a magnitude of $Y(0)-Y(1)$ is equal to or larger than 0 and smaller than $2^{K-1}$, an N-digit binary expression value of $(Y(0)-Y(1)+2^{K-1}) \bmod P$ is equal to or larger than the N-digit binary expression value of $2^{K-1} \bmod P$ when $X(0) \geq X(1)$ is satisfied, and the value of the K-th bit from the least significant bit is necessarily 1. On the other hand, in the case of $X(0)<X(1)$, the N-digit binary expression value of $(Y(0)-Y(1)+2^{K-1}) \bmod P$ is smaller than the N-digit binary expression value of $2^{K-1} \bmod P$, and the value of the K-th bit from the least significant bit is necessarily 0. Therefore, the value of the K-th bit from the least significant bit of the magnitude comparison bit string is 1 in the case of $X(0) \geq X(1)$ and is 0 in the case of $X(0)<X(1)$. A specific example in the case of N=7 and L=5 will be shown. For example, in the case of $X(0)=0$ and $X(1)=-1$, $Y(0)=32$ and $Y(1)=31$ are satisfied, the magnitude comparison bit string is 1000001, and the value of the seventh bit from the least significant bit is 1. For example, in the case of $X(0)=-10$ and $X(1)=-5$, $Y(0)=22$ and $Y(1)=27$ are satisfied, the magnitude comparison bit string is 0111011, and the value of the seventh bit from the least significant bit is 0 (step $S25_m$).

The magnitude comparing part $228_m$ obtains a secret sharing value $[q]_m$ of a value q of the K-th bit from the least significant bit of a magnitude comparison bit string representing the comparison result value $(Y(0)-Y(1)+2^{K-1}) \bmod P$ by secure computation, with the secret sharing value $[(Y(0)-Y(1)+2^{K-1}) \bmod P]_m$ as an input, and outputs the secret sharing value $[q]_m$. This process can be executed, for example, using bit decomposition of Reference Literature 2. However, other bit decomposition methods may be used (see, for example, Reference Literature 6: I. Damgard, M. Fitzi, E. Kiltz, J. B. Nielsen, and T. Toft, "Unconditionally secure constant-rounds multi-party computation for equality, comparison, bits and exponentiation," In S. Halevi and T. Rabin eds., TCC, Vol. 3876 of Lecture Notes in Computer Science, pp. 285-304. Springer, 2006, and the like) (step $S26_m$).

The secure computation apparatus $22_m$ outputs the secret sharing values $[r(0)]_m$, $[r(1)]_m$ and $[q]_m$ (step $S27_m$).

Modification 1 of Second Embodiment

In the second embodiment, $(Y(0)-Y(1)+2^{K-1}) \bmod P$ is the comparison result value (the value obtained by adding $2^{K-1}$ to the value obtained by subtracting the value represented by the target bit string $A(1)$ from the value represented by the target bit string $A(0)$). However, $Y(0)=(W(0)+2^L) \bmod P$ and $Y(1)=(W(1)+2^L) \bmod P$ are satisfied, and $(Y(0)-Y(1)+2^{K-1}) \bmod P=(W(0)-W(1)+2^{K-1}) \bmod P$ is satisfied. Therefore, $(W(0)-W(1)+2^{K-1}) \bmod P$ may be the comparison result value (the value obtained by adding $2^{K-1}$ to the value obtained by subtracting the value represented by the target bit string $A(1)$ from the value represented by the target bit string $A(0)$). In this case, after execution of steps $S21_m$ to $S24_m$ of the second embodiment, the magnitude comparison bit string acquiring part $227_m$ obtains a secret sharing value $[(W(0)-W(1)+2^{K-1}) \bmod P]_m$ of the comparison result value $(W(0)-W(1)+2^{K-1}) \bmod P$ by secure computation, with the secret sharing values $[W(0)]_m$ and $[W(1)]_m$ as an input, and outputs the secret sharing value $[(W(0)-W(1)+2^{K-1}) \bmod P]_m$ (step S25'm). After that, steps $S26_m$ to $S27_m$ of the second embodiment are executed using the secret sharing value $[(W(0)-W(1)+2^{K-1}) \bmod P]_m$ instead of the secret sharing value $[(Y(0)-Y(1)+2^{K-1}) \bmod P]_m$.

Modification 2 of Second Embodiment

In the second embodiment and the modification 1 of the second embodiment, the secure computation apparatus $22_m$ outputs the secret sharing values $[r(0)]_m$, $[r(1)]_m$ and $[q]_m$. However, even in the case of $T \geq 2$, only a secret sharing value of a value of each check bit of the check bit strings $C(0)$ and $C(1)$ may be outputted instead of $[r(0)]_m$ and $[r(1)]_m$. Further, the secure computation apparatus $22_m$ may generate and output a value that becomes the secret sharing value $[q]_m$ when both of the values of the check bits are 0 and becomes a secret sharing value representing an error when any of the values of the check bits is 1.

Modification 3 of Second Embodiment

It is also conceivable that the secret sharing values $[Y(0)]_m$ and $[Y(1)]_m$ are inputted to each secure computation apparatus $22_m$, and the process from step $S23_m$ to $S27_m$ is executed.

Third Embodiment

In a third embodiment, in addition to the null value check by secure computation, sorting by secure computation is performed.
<Configuration>

As illustrated in FIG. 1, a secure computation system 3 of the third embodiment has the sharing apparatus 11 and M secure computation apparatuses $32_0$-$32_{m-1}$, and these are configured to be communicable via a network such as the Internet. As illustrated in FIG. 2, the secure computation apparatus $32_m$ (m=0, . . . , M−1) of the present embodiment has the communication part $121_m$, the storage $122_m$, the controller $123_m$, the input operation part $224_m$, the check bit string acquiring part $225_m$, the null value checking part $226_m$, a sorting part $327_m$ and a sorting result utilization calculation part $328_m$. The secure computation apparatus $32_m$ executes each process under control of the controller $123_m$.

<Process>

Figure 9:
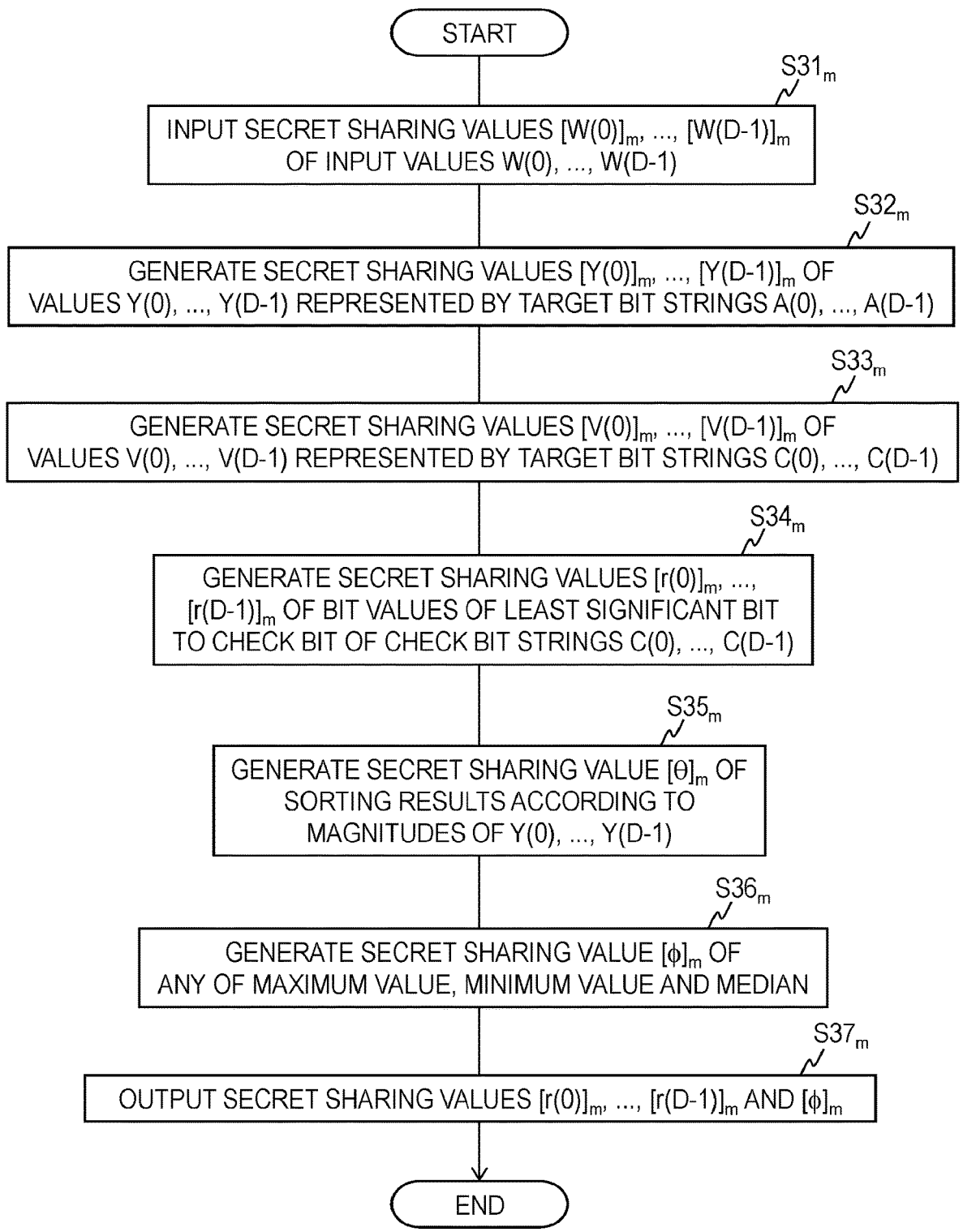
FIG. 9 is a flowchart for illustrating a process of a third embodiment.

Next, a process of the present embodiment will be described with reference to FIG. 9.

The sharing apparatus 11 generates a secret sharing value $[W(d)]_m$ of an input value W(d) and transmits the secret sharing value $[W(d)]_m$ to the secure computation apparatus $22_m$ (m=0, ..., M−1; d=0, ..., D−1; D is an integer equal to or larger than 2). The input value W(d) corresponds to a null value or a real number X(d). A format of the input values W(d) is the same as the format of the input value W described before. The secret sharing value $[W(d)]_m$ is received by the communication part $121_m$ of the secure computation apparatus $32_m$ (FIG. 2) and sent to the input operation part $124_m$ (step $S31_m$).

The input operation part $324_m$ obtains a secret sharing value $[Y(d)]_m$ of $Y(d)=(W(d)+2^L)$ mod P by secure computation, using the secret sharing value $[W(d)]_m$ of the input value W(d) and outputs the secret sharing value $[Y(d)]_m$. Here, Y(d) corresponds to "a value represented by a target bit string A(d)". The target bit strings A(d) is a bit string that corresponds to a null value when the most significant bit is 1 and corresponds to a real number when the most significant bit is 0 (step $S32_m$).

The check bit string acquiring part $325_m$ obtains a secret sharing value $[V(d)]_m$ of $V(d)=2^T \times Y(d)$ mod P by secure computation, with the secret sharing value $[Y(d)]_m$ as an input, and outputs the secret sharing value $[V(d)]_m$. Here, V(d) corresponds to "a value represented by a check bit string C(d)" (step $S33_m$).

The null value checking part $326_m$ obtains a secret sharing value $[r(d)]_m$ of each of bit values of the least significant bit to check bit of the check bit string C(d), with the secret sharing value $[V(d)]_m$ as an input, and outputs the secret sharing value $[r(d)]_m$. For example, in the case of T=1, the null value checking part $326_m$ obtains and outputs the secret sharing value $[r(d)]_m$ of a value of the check bit that is the least significant bit (step $S34_m$).

The sorting part $327_m$ performs sorting according to a magnitude of Y(d) by secure computation, with the secret sharing value [Y(d)] of Y(d) represented by the target bit string A(d) (d=0, ..., D−1) as an input, and obtains and outputs a secret sharing value $[\theta]_m$ of a result of the sorting. Here, Y(d) corresponds to a real number X(d) that is larger as Y(d) is larger. A method for performing sorting by secure computation is not limited, and sorting can be executed by a well-known method. For example, the sorting part $327_m$ obtains a string of a vector [BitA(d)] constituted by secret sharing values of bit values of the target bit string A(d) by bit decomposition of Reference Literature 2, sorts the string of the vector [BitA(d)] by the method of Reference Literature 3, 4 or the like, and outputs the secret sharing value $[\theta]_m$, that is a result of the sorting. The secret sharing value $[\theta]_m$ is, for example, a string of [BitA(d)] that has been sorted (step $S35_m$).

The sorting result utilization calculation part $328_m$ obtains the secret sharing value $[\theta]_m$, which is the sorting result, and obtains and outputs a secret sharing value $[\phi]_m$ of any of a maximum value, a minimum value and a median. In the case of obtaining the secret sharing value of the maximum value, the sorting result utilization calculation part $328_m$ selects and outputs, for example, the last element of the sorted string of [BitA(d)]. In the case of obtaining the secret sharing value of the minimum value, the sorting result utilization calculation part $328_m$ selects and outputs, for example, the first element of the sorted string of [BitA(d)]. In the case of obtaining the secret sharing value of the median, for example, a process as shown below is performed. When D is an odd number, the sorting result utilization calculation part $328_m$ outputs a secret sharing value of a string with elements that are values twice the values of elements of a central string among sorted strings of [BitA(d)]. When D is an even number, the sorting result utilization calculation part $328_m$ outputs a secret sharing value of a string obtained by adding up two strings closest to the center of the sorted strings of [BitA(d)].

The secure computation apparatus $32_m$ outputs secret sharing values $[r(d)]_m$ (d=0, ..., D−1) and $[\phi]_m$ (step $S37_m$).

Modification 1 of Third Embodiment

Figure 10:
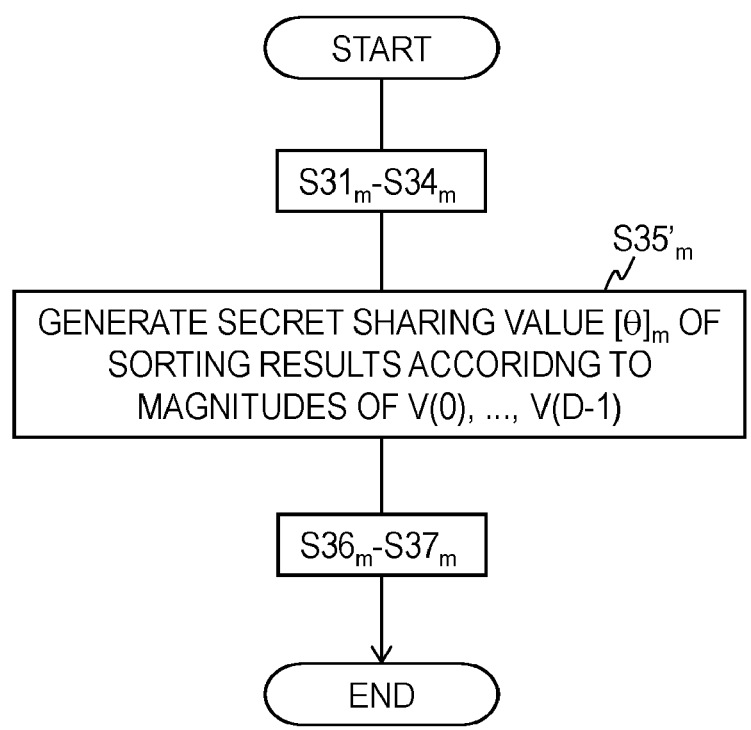
FIG. 10 is a flowchart for illustrating a process of a modification 1 of the third embodiment.

In the third embodiment, the sorting part $327_m$ performs sorting according the magnitude of Y(d) by secure computation, with the secret sharing value [Y(d)] of Y(d) represented by the target bit string A(d) (d=0, ..., D−1) as an input, and obtains and outputs the secret sharing value $[\theta]_m$ (step $S35_m$). Instead, as shown in FIG. 10, the sorting part $327_m$ may perform sorting according to the magnitude of the value V(d) represented by the check bit string C(d) by secure computation, with the secret sharing value $[V(d)]_m$ as an input, and obtain and output the secret sharing value $[\theta]_m$, which is a result of the sorting (step S35'm).

Modification 2 of Third Embodiment

In the third embodiment and the modification 1 of the third embodiment, the secure computation apparatus $32_m$ outputs the secret sharing values $[r(d)]_m$ (d=0, ..., D−1) and $[\phi]_m$. However, even in the case of T≥2, only a secret sharing value of a value of each check bit of the check bit string C(d) may be outputted instead of $[r(d)]_m$ (d=0, ..., D−1). Further, $[\theta]_m$ may be outputted instead of $[\phi]_m$. Further, the secure computation apparatus $32_m$ may generate and output a value that becomes a secret sharing value $[\phi]_m$ or $[\theta]_m$ when all of the values of the check bits are 0 and becomes a secret sharing value representing an error when any of the values of the check bits is 1.

Modification 3 of Third Embodiment

It is also conceivable that the secret sharing value $[Y(d)]_m$ is inputted to each secure computation apparatus $32_m$, and the process from step $S33_m$ to $S37_m$ is executed.

Fourth Embodiment

An embodiment obtained by combining the first to third embodiments is possible, or an embodiment in which at least a part of the embodiments is replaced with a modification described before is also possible. As illustrated in FIG. 1, a calculation system 4 in such an embodiment has the sharing apparatus 11 and M secure computation apparatuses $42_0$-$42_{M−1}$, and these are configured to be communicable via a network such as the Internet. The secure computation apparatus $42_m$ (m=0, ..., M−1) has the communication part $121_m$, the storage $122_m$, the controller $123_m$, the input operation part $124_m$, the check bit string acquiring part $125_m$, the null value checking part $126_m$, the magnitude comparison bit string acquiring part $227_m$, the magnitude comparing part $228_m$, the sorting part $327_m$ and the sorting result utilization calculation part $328_m$. The secure computation apparatus $42_m$ executes each process under control of the controller $123_m$. The process of each part is as described in the first to third embodiments and the modifications of the first to third embodiments.

Other Modifications and the Like

The present invention is not limited to the embodiments described above. For example, the secret sharing value $[W]_m$ may be a secure computation result by another secure computation apparatus. Further, at least a set of a part of apparatuses may exchange information via portable recording media instead of each of the apparatuses exchanging information via a network. Otherwise, at least a set of a part of the apparatuses may exchange information via non-portable recording media. The combination of a part of the apparatuses may be a single apparatus.

The various processes described above are not necessarily executed in chronological order in accordance with the description but may be executed in parallel or individually according to processing power of an apparatus to execute the processes or as necessary. In addition, it goes without saying that a change can be made within a range not departing from the spirit of the present invention.

In the case of realizing the configuration described above by a computer, processing content of functions each apparatus should be provided with is written by a program. By executing the program on the computer, the processing functions are realized on the computer. The program in which the processing content is written can be recorded in a computer-readable recording medium. An example of the computer-readable recording medium is a non-transitory recording medium. Examples of such a recording medium include a magnetic storage device, an optical disk, a magneto-optical recording medium, a semiconductor memory and the like.

Distribution of this program is performed, for example, by selling, transfer, lending and the like of a portable recording medium such as a DVD and a CD-ROM in which the program is recorded. Furthermore, a configuration is also possible in which this program is stored in a storage device of a server computer and is distributed by being transferred from the server computer to other computers via a network.

For example, a computer that executes such a program stores the program recorded in a portable recording medium or the program transferred from the server computer into its own storage device once first. At the time of executing a process, this computer reads the program stored in its own storage device and executes the process in accordance with the read program. As other execution forms of this program, the computer may read the program directly from the portable recording medium and execute a process in accordance with the program; and, furthermore, each time a program is transferred to the computer from the server computer, the computer may sequentially execute a process in accordance with the received program. A configuration is also possible in which the program is not transferred to the computer from the server computer, but the processes described above are executed by a so-called ASP (application service provider) type service in which a processing function is realized only by an instruction to execute the program and acquisition of a result.

In the above embodiments, the processing functions of the present apparatus are realized by executing a predetermined program on a computer. At least a part of the processing functions, however, may be realized by hardware.

The techniques of the above embodiments can be used for numerical calculation and aggregation processing by secure computation.

For example, the techniques of the above embodiments can be applied to aggregation of questionnaire results, aggregation of voting results and the like.

DESCRIPTION OF REFERENCE NUMERALS

1 to 4: secure computation system
11: sharing apparatus
$12_m$ to $42_m$: secure computation apparatus

The invention claimed is:

1. A secure computation apparatus comprising:
processing circuitry configured to
obtain, using a first secret sharing value of a value represented by a first target bit string that corresponds to a null value when a most significant bit is 1 and corresponds to a real number when the most significant bit is 0, a second secret sharing value of a value represented by a first check bit string obtained by setting a value of the most significant bit of the first target bit string to be equivalent to a value of a first check bit lower than the most significant bit; and
obtain and output secret sharing values of bit values of a least significant bit to the first check bit of the first check bit string using the second secret sharing value of the value represented by the first check bit string, wherein
a second target bit string is a bit string that corresponds to a null value when a most significant bit is 1 and corresponds to a real number when the most significant bit is 0;
the processing circuitry of the secure computation apparatus is further configured to:
obtain a third secret sharing value of a comparison result value representing a value obtained by adding $2^{K-1}$ to a value obtained by subtracting a value represented by the second target bit string from the value represented by the first target bit string; and
obtain a fourth secret sharing value of a value of a K-th bit from a least significant bit of a bit string representing the comparison result value; and
K is an integer equal to or larger than 2, and a magnitude of the value represented by the first target bit string the most significant bit of which is 0 and the value represented by the second target bit string the most significant bit of which is 0 is equal to or larger than 0 and smaller than $2^{K-1}$.

2. The secure computation apparatus according to claim 1, wherein
N is an integer equal to or larger than 2; $P=2^N-1$ is satisfied; L is an integer satisfying $0 \leq L \leq N-u'$; u' is a positive integer equal to or larger than 2 and equal to or smaller than N; and X is an integer satisfying $-2^L \leq X \leq 2^{N-1}-2^L-1$;
the first target bit string is a string constituted by N bits;
a value represented by the first target bit string corresponding to a null value is $Y=\{2^L+(P+1)/2\} \bmod P$;
a value represented by the first target bit string corresponding to X that is an integer equal to or larger than 0 is $Y=(2^L+X) \bmod P$; and
a value represented by the first target bit string corresponding to X that is a negative integer is $Y=(P+2^L+X) \bmod P$.

3. The secure computation apparatus according to claim 2, the processing circuitry being further configured to obtain a fifth secret sharing value of the value $Y=(W+2^L)$ mod P which is represented by the first target bit string, using a sixth secret sharing value of an input value W, a value of the input value W corresponding to a null value being $W=(P+1)/2$ mod P, a value of the input value W corresponding to X that is an integer equal to or larger than 0 being $W=X$ mod P, and a value of the input value W corresponding to X that is a negative integer being $W=(P+X)$ mod P.

4. The secure computation apparatus according to claim 1, the processing circuitry being further configured to:
   obtain a fifth secret sharing value of a value represented by a second check bit string obtained by setting a value of the most significant bit of the second target bit string is set to a value of a second check bit lower than the most significant bit, using a sixth secret sharing value of a value represented by the second target bit string; and
   obtain secret sharing values of bit values of a least significant bit to the second check bit of the second check bit string using the sixth secret sharing value of the value represented by the second check bit string.

5. A secure computation apparatus comprising:
   processing circuitry configured to
   obtain, using a first secret sharing value of a value represented by a target bit string A(d) that corresponds to a null value when a most significant bit is 1 and corresponds to a real number when the most significant bit is 0 wherein d=0, ..., D−1 is satisfied, and D is an integer equal to or larger than 2, a second secret sharing value of a value represented by a check bit string C(d) obtained by setting a value of the most significant bit of the target bit string A(d) to be equivalent to a value r(d) of a check bit lower than the most significant bit;
   obtain a third secret sharing value of bit values of a least significant bit to the check bit of the first check bit string C(d) using the secret sharing value of the value represented by the check bit string C(d); and
   obtain a fourth secret sharing value of a sorting result according to a magnitude of the value represented by the target bit string A(d) or a fifth secret sharing value of a sorting result according to a magnitude of the value represented by the check bit string C(d); wherein
   when the processing circuitry obtains the fourth secret sharing value of the sorting result according to the magnitude of the value represented by the target bit string A(d), the value represented by the target bit string A(d) the most significant bit of which is 0 corresponds to a larger real number as the value represented by the target bit string A(d) is larger; and
   when the processing circuitry obtains the fifth secret sharing value of the sorting result according to the magnitude of the value represented by the check bit string C(d), a value represented by the check bit string C(d) corresponding to the target bit string A(d) the most significant bit of which is 0 corresponds to a larger real number as the value represented by the check bit string C(d) is larger.

6. A secure computation method implemented by a secure computation apparatus comprising:
   performing, by processing circuitry of the secure computation apparatus,
      a first check bit string acquiring step of obtaining, using a first secret sharing value of a value represented by a first target bit string that corresponds to a null value when a most significant bit is 1 and corresponds to a real number when the most significant bit is 0, a second secret sharing value of a value represented by a first check bit string obtained by setting a value of the most significant bit of the first target bit string to be equivalent to a value of a first check bit lower than the most significant bit; and
      a first null value checking step of obtaining and outputting secret sharing values of bit values of a least significant bit to the first check bit of the first check bit string using the second secret sharing value of the value represented by the first check bit string,
   wherein
   a second target bit string is a bit string that corresponds to a null value when a most significant bit is 1 and corresponds to a real number when the most significant bit is 0;
   the method further including:
      obtaining a third secret sharing value of a comparison result value representing a value obtained by adding $2^{K-1}$ to a value obtained by subtracting a value represented by the second target bit string from the value represented by the first target bit string; and
      obtaining a fourth secret sharing value of a value of a K-th bit from a least significant bit of a bit string representing the comparison result value; and
   K is an integer equal to or larger than 2, and a magnitude of the value represented by the first target bit string the most significant bit of which is 0 and the value represented by the second target bit string the most significant bit of which is 0 is equal to or larger than 0 and smaller than $2^{K-1}$.

7. A secure computation method implemented by a secure computation apparatus comprising:
   performing, by processing circuitry of the secure computation apparatus,
      a check bit string acquiring step of obtaining by processing circuitry of the secure computation apparatus, using a first secret sharing value of a value represented by a target bit string A(d) that corresponds to a null value when a most significant bit is 1 and corresponds to a real number when the most significant bit is 0 wherein d=0, ..., D−1 is satisfied, and D is an integer equal to or larger than 2, a second secret sharing value of a value represented by a check bit string C(d) obtained by setting a value of the most significant bit of the target bit string A(d) to be equivalent to a value r(d) of a check bit lower than the most significant bit;
      a null value checking step of obtaining a third secret sharing value of bit values of a least significant bit to the check bit of the first check bit string C(d) using the secret sharing value of the value represented by the check bit string C(d); and
      a sorting step of obtaining a fourth secret sharing value of a sorting result according to a magnitude of the value represented by the target bit string A(d) or a fifth secret sharing value of a sorting result according to a magnitude of the value represented by the check bit string C(d); wherein
   when the fourth secret sharing value of the sorting result according to the magnitude of the value represented by the target bit string A(d) is obtained at the sorting step, the value represented by the target bit string A(d) the most significant bit of which is 0 corresponds to a larger real number as the value represented by the target bit string A(d) is larger; and when the fifth secret sharing value of the sorting result according to the magnitude of the value represented by the check bit string C(d) is obtained at the sorting step, a value represented by the check bit string C(d) corresponding to the target bit string A(d) the most significant bit of which is 0 corresponds to a larger real number as the value represented by the check bit string C(d) is larger.

8. A non-transitory computer readable recording medium including stored therein a program for causing a compute to function as the secure computation apparatus comprising:
processing circuitry configured to
obtain, using a first secret sharing value of a value represented by a first target bit string that corresponds to a null value when a most significant bit is 1 and corresponds to a real number when the most significant bit is 0, a second secret sharing value of a value represented by a first check bit string obtained by setting a value of the most significant bit of the first target bit string to be equivalent to a value of a first check bit lower than the most significant bit; and
obtaining and outputting secret sharing values of bit values of a least significant bit to the first check bit of the first check bit string using the second secret sharing value of the value represented by the first check bit string,
wherein
a second target bit string is a bit string that corresponds to a null value when a most significant bit is 1 and corresponds to a real number when the most significant bit is 0;
the processing circuitry of the secure computation apparatus is further configured to:
obtain a third secret sharing value of a comparison result value representing a value obtained by adding $2^{K-1}$ to a value obtained by subtracting a value represented by the second target bit string from the value represented by the first target bit string; and
obtain a fourth secret sharing value of a value of a K-th bit from a least significant bit of a bit string representing the comparison result value; and
K is an integer equal to or larger than 2, and a magnitude of the value represented by the first target bit string the most significant bit of which is 0 and the value represented by the second target bit string the most significant bit of which is 0 is equal to or larger than 0 and smaller than $2^{K-1}$.

\* \* \* \* \*